L. T. McGILVRAY.
Velocipedes.

No. 140,290.  Patented June 24, 1873.

Witnesses:
G. Mathys.
Colon C. Kennon

Inventor:
Lewis T. McGilvray
Per  [signature]
Attorneys.

UNITED STATES PATENT OFFICE.

LEWIS T. McGILVRAY, OF STAUNTON, VIRGINIA.

IMPROVEMENT IN VELOCIPEDES.

Specification forming part of Letters Patent No. 140,290, dated June 24, 1873; application filed November 27, 1872.

*To all whom it may concern:*

Be it known that I, LEWIS T. MCGILVRAY, of Staunton, in the county of Augusta and State of Virginia, have invented a Geared Hand-Carriage, of which the following is a specification:

The invention consists in combining with a vehicle, having ordinary sustaining-wheels and a guide-wheel in front, a series of crank-shafts and intermediate gear-wheels, by which power is easily and conveniently transferred from the hand to the axle.

Figure 1:
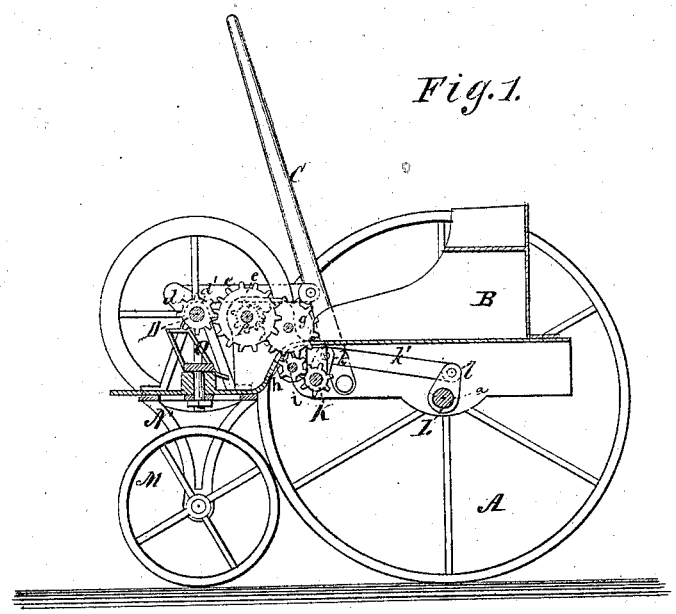
Figure 2:
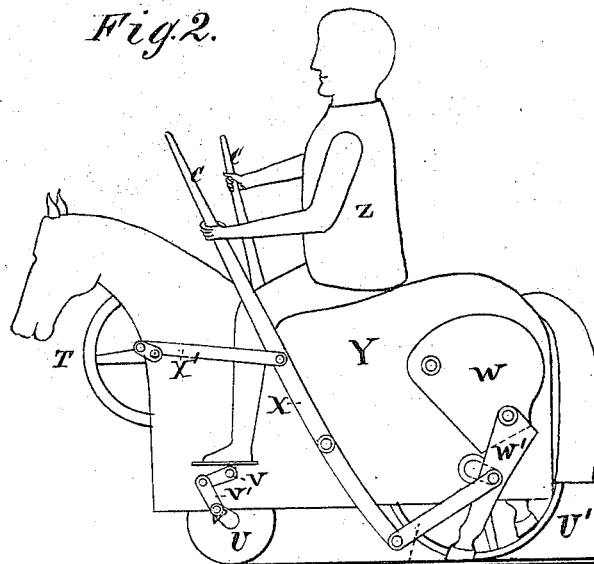

Figure 1 is a sectional elevation, showing one form of my invention, and Fig. 2 is a side view of a modification.

A A in the drawing represent a pair of large wheels, having an axle, $a$, on which is supported the seat-frame B. C C are two hand-levers, (only one shown in Fig 1,) which are pivoted to the sides of frame B. $c\ c$ are straps that connect the levers to the crank-arms $d\ d$, arranged at an angle to one another on shaft D. On shaft D is also a pinion, $d'$, that drives the series of wheels $e\ f\ g\ h\ i$. The latter turns a shaft, K, having crank-arms $k\ k$ placed at an angle to each other, and connected by straps $k'\ k'$ to the arms $l\ l$, which are also placed at a corresponding angle to each other on the axle L. M is the guide-wheel, placed in a frame, N, swiveled so as to be turned by foot-pressure on either side of plate O.

The operation is as follows: The person sitting in the carriage works the hand-levers C C in opposite directions with his hands, while he steers with his feet against the plate O. The power is transmitted through the gear-wheels to the crank-shaft K that rotates through its connections the axle L. Both wheels A A may be fast to the axle, or one may be loose. The carriage may be open or inclosed in a case representing a horse or other animal.

In Fig. 2 is shown a modification of my invention as applied to another form. Z represents the figure of a man; Y, a horse; X X, the propelling-levers; X' X', the straps which connect them to the operative mechanism placed within. W W' are the hind legs, V V' the fore legs, and T the balance-wheel.

Having thus described my invention, what I claim as new, and desire to secure by Letters Patent, is—

A vehicle having hand-levers, connecting rods, crank-axles, and intermediate gear-wheels, combined and operated substantially as shown and described, and for the purpose set forth.

LEWIS T. McGILVRAY.

Witnesses:
H. A. WALKER,
JACOB BUMGARDNER.